US006197856B1

(12) United States Patent
Dean et al.

(10) Patent No.: US 6,197,856 B1
(45) Date of Patent: Mar. 6, 2001

(54) COPOLYMER BINDER FIBERS

(75) Inventors: Leron R. Dean; Michael D. Lambert; William A. Haile, all of Kingsport; F. Henry Dillow, Mt. Carmel; Mark E. Tincher, Kingsport, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/143,437

(22) Filed: Aug. 28, 1998

Related U.S. Application Data

(60) Provisional application No. 60/057,800, filed on Aug. 28, 1997.

(51) Int. Cl.[7] .................................................. C08G 64/00
(52) U.S. Cl. .......................................... 524/141; 528/272
(58) Field of Search .............................. 524/141; 528/272

(56) References Cited

U.S. PATENT DOCUMENTS

| | | | |
|---|---|---|---|
| Re. 32,765 | 10/1988 | Callander et al. | 524/382 |
| 2,901,466 | 8/1959 | Kibler et al. | 260/75 |
| 3,589,956 | 6/1971 | Krantz et al. | 156/62.4 |
| 3,907,754 | 9/1975 | Tershansy et al. | 260/75 |
| 3,962,189 | 6/1976 | Russin et al. | 260/75 R |
| 4,010,145 | 3/1977 | Russin et al. | 260/75 R |
| 4,081,428 | 3/1978 | R. Thompson | 260/75 |
| 4,093,603 | 6/1978 | Jackson, Jr. et al. | 260/75 R |
| 4,094,721 | 6/1978 | Sturm et al. | 156/309 |
| 4,116,942 | 9/1978 | Weinberg et al. | 528/283 |
| 4,189,338 | 2/1980 | Ejima et al. | 156/167 |
| 4,217,426 * | 8/1980 | McConnell et al. | 525/173 |
| 4,340,526 | 7/1982 | Petke et al. | 524/292 |
| 4,356,299 | 10/1982 | Cholod et al. | 528/279 |
| 4,419,507 * | 12/1983 | Sublett | 528/302 |
| 4,450,250 | 5/1984 | McConnell et al. | 524/141 |
| 4,468,490 | 8/1984 | Meyer, Jr. et al. | 524/311 |
| 4,521,556 | 6/1985 | Adams | 524/88 |
| 4,540,749 | 9/1985 | Meyer, Jr. et al. | 525/437 |
| 4,576,997 | 3/1986 | Trotter et al. | 525/444 |
| 4,668,453 | 5/1987 | Ebnesajjad et al. | 264/78 |
| 4,668,764 | 5/1987 | Satou | 528/308.1 |
| 4,740,581 | 4/1988 | Pruett et al. | 528/289 |
| 4,745,174 | 5/1988 | Pruett et al. | 528/289 |
| 4,749,772 | 6/1988 | Weaver et al. | 528/288 |
| 4,749,773 | 6/1988 | Weaver et al. | 528/288 |
| 4,749,774 | 6/1988 | Weaver et al. | 528/288 |
| 4,950,732 | 8/1990 | Weaver et al. | 528/288 |
| 4,999,388 | 3/1991 | Okamoto | 523/400 |
| 5,017,680 | 5/1991 | Sublett | 528/274 |
| 5,057,561 * | 10/1991 | Manica et al. | 524/68 |
| 5,106,944 | 4/1992 | Sublett | 528/279 |
| 5,166,311 | 11/1992 | Nichols | 528/285 |
| 5,219,941 | 6/1993 | Meyer, Jr. et al. | 525/173 |
| 5,252,699 | 10/1993 | Chamberlin et al. | 528/289 |
| 5,292,783 | 3/1994 | Buchanan et al. | 524/37 |
| 5,312,797 | 5/1994 | Takiguchi et al. | 503/227 |
| 5,340,907 | 8/1994 | Yau et al. | 528/274 |
| 5,340,910 | 8/1994 | Chamberlin et al. | 528/289 |

(List continued on next page.)

FOREIGN PATENT DOCUMENTS

| | | |
|---|---|---|
| 197 15 682 A1 | 10/1997 | (DE) . |
| 0 517 171 A2 | 12/1992 | (EP) . |
| 0 526 645 A1 | 2/1993 | (EP) . |
| 532 988 A1 | 3/1993 | (EP) . |
| 542 239 A1 | 5/1993 | (EP) . |
| 1 029136 | 5/1962 | (GB) . |
| 977 104 | 12/1964 | (GB) . |
| 1047072 * | 11/1966 | (GB) ............................ C08G/17/08 |
| 1053374 | 12/1966 | (GB) . |
| 1344492 | 1/1974 | (GB) ......................................... 7/4 |
| 63-203818 | 8/1988 | (JP) . |
| 05-005212 | 1/1993 | (JP) . |
| 505 9616 | 3/1993 | (JP) . |
| 509 7985 | 4/1993 | (JP) . |
| 08092816 | 4/1996 | (JP) . |
| 824 5778 | 9/1996 | (JP) . |
| WO 84/02144 | 6/1984 | (WO) . |
| WO 96/15175 | 1/1996 | (WO) . |
| WO 96/15176 | 1/1996 | (WO) . |
| WO 96/04422 | 2/1996 | (WO) . |
| WO 96/15173 | 5/1996 | (WO) . |
| WO 96/15174 | 5/1996 | (WO) . |
| WO 96/25446 | 8/1996 | (WO) . |
| WO 96/25448 | 8/1996 | (WO) . |
| 97/30102 | 8/1997 | (WO) . |
| WO 98/12245 | 3/1998 | (WO) . |
| 99/10573 | 4/1999 | (WO) . |
| 99/24648 | 5/1999 | (WO) . |

OTHER PUBLICATIONS

International Search Report, dated Feb. 2, 1999, in International Application No. PCT/US98/17813.
"Chemical Substances of Melty," Unitika Ltd., Product Brochure, Apr. 1993.
"Types of Bellcombi," Kanebo Ltd., Product Brochure.
"Textile Fibers Group Hoechst Celanese Corporation," Hoechst Celanese, Product Brochure.
"Improved Color Poly(ethylene/1,4–cyclohexylenedimethylene terephthalate)," Research Disclosure, No. 359, Mar. 1994, pp. 142–144.
R. Bass, "PCT and PETG Polyester Fibers for Nonwovens," INDA–TEC 96, Nonwovens Conference, 1996, pp. 19.1–19.9.
International Search Report, dated Apr. 8, 1999, in International Application No. PCT/US98/23599.

*Primary Examiner*—Terressa M. Boykin
(74) *Attorney, Agent, or Firm*—Jonathan D. Wood; Harry J. Gwinnell

(57) ABSTRACT

The invention relates to binder fibers made from copolyesters, the copolyesters themselves and catalysts and processes for producing the copolyesters. More particularly, the invention relates to copolyesters formed from 1,4-cyclohexanedimethanol, ethylene glycol and terephthalic acid, napthalenedicarboxylic acid, 1,4-cyclohexane dicarboxylic acid and esters or anhydrides thereof. Such copolyesters may be formed into a variety of products, especially binder fibers for nonwoven fabrics.

28 Claims, No Drawings

U.S. PATENT DOCUMENTS

| | | | |
|---|---|---|---|
| 5,348,699 | 9/1994 | Meyer et al. | 264/176.1 |
| 5,372,864 | 12/1994 | Weaver et al. | 428/36.92 |
| 5,384,377 | 1/1995 | Weaver et al. | 525/437 |
| 5,385,773 | 1/1995 | Yau et al. | 428/221 |
| 5,393,863 | 2/1995 | Yau et al. | 528/308.4 |
| 5,393,871 | 2/1995 | Yau et al. | 528/308.4 |
| 5,446,079 | 8/1995 | Buchanan et al. | 524/41 |
| 5,453,479 | 9/1995 | Borman et al. | 528/279 |
| 5,559,171 | 9/1996 | Buchanan et al. | 524/41 |
| 5,580,911 | 12/1996 | Buchanan et al. | 524/41 |
| 5,599,858 | 2/1997 | Buchanan et al. | 524/41 |
| 5,608,031 | 3/1997 | Yau et al. | 528/281 |
| 5,643,991 | 7/1997 | Stipe et al. | 524/496 |
| 5,656,715 | 8/1997 | Dickerson et al. | 528/271 |
| 5,656,716 | 8/1997 | Schmidt et al. | 528/279 |
| 5,668,243 | 9/1997 | Yau et al. | 528/280 |
| 5,681,918 | 10/1997 | Adams et al. | 528/279 |
| 5,688,899 | 11/1997 | Strand et al. | 528/279 |
| 5,744,571 | 4/1998 | Hilbert et al. | 528/272 |
| 5,773,554 | 6/1998 | Dickerson et al. | 528/271 |
| 5,889,135 | 3/1999 | Warzelhan et al. | 528/17 |

\* cited by examiner

COPOLYMER BINDER FIBERS

PRIORITY DATA

This application claims benefit under 35 U.S.C. § 119 of provisional application 60/057,800 filed Aug. 28, 1997. The entire disclosure of the provisional application is incorporated herein by reference.

FIELD OF THE INVENTION

The invention relates to binder fibers made from copolyesters, the copolyesters themselves and catalysts and processes for producing the copolyesters. More particularly, the invention relates to copolyesters formed from 1,4-cyclohexanedimethanol, ethylene glycol and terephthalic acid, napthalenedicarboxylic acid, 1,4-cyclohexanedicarboxylic acid and esters or anhydrides thereof. Such copolyesters may be formed into a variety of products, especially binder fibers for nonwoven fabrics.

BACKGROUND OF THE INVENTION

Nonwoven fabrics are widely used in a variety of products. For example, nonwoven fabrics are suitable for use in filters, roofing materials, composites, backing materials, linings, insulation, medical/surgical applications, bedding, tablecloths, and diapers. High loft batting nonwoven fabrics are also used in a wide variety of products, including comforters, robe wear, and bra cups. Generally nonwoven fabrics are based on polyester, acrylic, nylon, glass and cellulosic fibers which may be bonded with latex adhesives, binder fibers, or polymers in powder form. The bonding of nonwoven fabrics with binder fibers provides a convenient method for making nonwoven fabrics without the need for water-based adhesives which are less environmentally friendly. Nonwoven fabrics bonded with binder fibers are economical to produce, and provide a method for making articles, which are unique or superior in performance.

Certain copolyesters have been found to be useful as binder fibers. For example, polyethylene terephthalate (PET) copolyesters containing 1,4-cyclohexanedimethanol having inherent viscosity (I.V.) values in the range of about 0.6 to about 0.8 have been used in the past as binder fibers to bond polyester or other fibers. Copolyesters with lower I.V. values, however, were believed to not have adequate bonding strength.

It is well known that copolyesters can be prepared by processes involving polyesterification and polycondensation. Generally, as described in U.S. Pat. Nos. 2,901,466, 5,017,680, 5,106,944, 5,668,243 and 5,668,243, the reactants are a glycol component and a dicarboxylic acid component. Typically, the dicarboxylic acid component is terephthalic acid and the dihydric alcohol is ethylene glycol. Such copolyesters are relatively inert, hydrophobic materials which are suitable for a wide variety of uses, including, molded articles, food trays, fibers, sheeting, films and containers, such as bottles. The use of ethylene glycol as the only diol, however, is accompanied by undesirable properties such as yellow discoloration and weak fiber binding properties. Indeed, such polymers tend to be opaque, crystalline polymers with high melting temperatures which make them unsuitable for use as binder fibers. To remedy the problems with polyethylene terephthalates, polyethylene terephthalate copolyesters have been formed with 1,4-cyclohexanedimethanol.

The preparation of copolyesters with ethylene glycol, 1,4-cyclohexanedimethanol and terephthalic acid is typically conducted in the presence of a catalyst materials. The choice of materials for such have generally focused on a variety of combinations of materials including catalysts derived from antimony, cadmium, calcium, gallium, germanium, lithium, magnesium, manganese, titanium, and zinc. An exemplary catalyst system for the preparation of polyethylene terephthalate is described in U.S. Pat. No. 3,907,754. Unfortunately, previous catalyst systems have not been entirely successfiil as they can produce copolyesters having an undesirable discoloration. Thus, there exists a need in the art for a catalyst system which provides efficient reaction times while producing high clarity copolyesters, especially high clarity copolyester binder fibers.

Furthermore, previous attempts at forming copolyesters with 1,4-cyclohexanedimethanol have focused upon copolyesters having high inherent viscosities, I.V. of greater than 0.6, due to the beliefs that low inherent viscosities would not possess adequate strength. In particular, it was believed that low inherent viscosity copolyesters were unable to provide adequate bonding strength to form commercially acceptable binder fibers. Indeed, previous polyethylene terephthalate copolyesters having 1,4-cyclohexanedimethanol were made with inherent viscosities ranging from 0.6 to 0.8 to form binder fibers to bond polyesters or other fibers. However, such attempts have not been entirely successful in providing copolyesters having the desired high clarity and hue or bonding capability at low activation temperatures when in the form of a binder fiber. Thus, there exists a need in the art for a copolyester having an inherent viscosity of less than 0.6 while possessing improved clarity, color and binder fiber bonding strength at low activation temperatures.

SUMMARY OF THE INVENTION

The invention answers the problems connected with previous binder fibers and copolyesters by providing binder fiber copolyesters having excellent color, thermoplastic flow and increased bonding versatility as well as catalysts for producing such copolyesters. The copolyesters of the invention are suitable for use in a wide variety of applications, such as binder fibers for making nonwoven fabrics in textile and industrial yarns.

More specifically, the invention provides copolyesters which are prepared with a glycol component and a dicarboxylic acid component. The glycol component generally contains 1,4 cyclohexanedimethanol in an amount ranging from 10 to 60 mole % and ethylene glycol in an amount ranging from about 40 to about 90 mole %. At least about 90 mole % of the dicarboxylic acid component is selected from the group consisting of acids, esters or anhydrides of terephthalic acid, napthalenedicarboxylic acid, 1,4-cyclohexane dicarboxylic acid and mixtures thereof. The copolyester of the invention is formed such that the resulting copolyesters have inherent viscosities of less than 0.6 and excellent thermoplastic flow and bonding capability. Indeed, the copolyesters of the invention are particularly suited for use as binder fibers as the copolyesters possess a lower I.V. which allows improved bonding of the binder fiber for nonwoven fabrics at relatively low temperatures. The invention is discussed in more detail below.

DETAILED DESCRIPTION

The invention relates to binder fibers made from copolyesters, the copolyesters themselves and catalysts and processes for producing the copolyesters. The copolyesters of the invention possess excellent color as they are clearer, exhibit a neutral hue or brighter appearance than previous copolyesters and may accept dyes more easily than higher I.V. copolyesters. Indeed, through the use of a lower I.V. a copolyester polymer is formed which is clear and non opaque and may readily be processed into binder fibers having superior binding properties. Furthermore, the processing of the copolyesters into binder fibers is aided by the lower spin melt temperatures of the lowered I.V. copolyesters of the invention.

The copolyesters of the invention are formed from the reaction of a glycol component and a dicarboxylic acid component. Generally, the glycol component comprises 1, 4 cyclohexanedimethanol in an amount ranging from 10 to 60 mole % and ethylene glycol in an amount ranging from about 40 to about 90 mole %. The dicarboxylic acid component contains at least about 90 mole % of an acid, ester or anhydride of terephthalic acid, napthalenedicarboxylic acid, 1,4-cyclohexanedicarboxylic acid and mixtures thereof. The copolyesters of the invention possess an I.V. of between about 0.36 to 0.58. These features and others are discussed in more detail below.

Glycol Component

As mentioned above, the glycol component generally comprises 1, 4 cyclohexanedimethanol in an amount ranging from 10 to 60 mole % and ethylene glycol in an amount ranging from about 40 to about 90 mole %. Preferably the 1, 4 cyclohexanedimethanol is present in an amount ranging from about 20 to about 40 mole %, more preferably about 25 to about 35 mole %. The 1, 4 cyclohexanedimethanol may be a cis-, trans-, or cis/trans mixture of isomers. The ethylene glycol is preferably present in an amount ranging from about 60 to about 80 mole % and more preferably about 65 to 75 mole %.

In addition to the 1,4 cyclohexanedimethanol and ethylene glycol, the glycol component may include up to about 20 mole %, and preferably up to about 4 mole % diethylene glycol and also up to about 10 mole % of conventional glycols including, but not limited to, glycols containing about 3 to about 12 carbon atoms such as propylene glycol, 1,3- propanediol, 1,4-butanediol, 1,5-pentanediol, neopentyl glycol, 2,2-dimethyl-1,3-propanediol, 1,6- hexanediol, 2,2, 4-trimethyl-1,3-propanediol, 2-ethyl-2-butyl-1,3-propanediol, 2,2,4,4-tetramethyl 1,3 cyclobutanediol, 2,4-dimethyl-2-ethylhexane-1,3-diol, 2-ethyl-2-isobutyl-1,3-propanediol, 1,3-butanediol, neopentyl glycol, 1,8-octanediol, 2,2,4-trimethyl-1,6-hexanediol, thiodiethanol, 1,2-cyclohexanedimethanol, and 1,3-cyclohexanedimethanol.

Dicarboxylic Acid Component

The dicarboxylic acid component contains about 90% or more of an acid, ester or anhydride of terephthalic acid, napthalenedicarboxylic acid, and 1,4-cyclohexanedicarboxylic acid. It should be noted that any of the naphthalenedicarboxylic acid isomers or mixtures of isomers may be used with the 1,4-, 1,5-, 2,6- and 2,7-isomers being preferred. Additionally, the 1,4-cyclohexanedicarboxylic acid moieties may be as the cis-, trans- or cis/trans mixtures of isomers. The preferred dicarboxylic acid component is dimethyl terephthalate.

Additional dicarboxylic acid components, (other than acids, esters or anhydrides of terephthalic acid, napthalenedicarboxylic acid, and 1,4-cyclohexane dicarboxylic acid), may be added in amounts of up to 10 mole %. Suitable additional dicarboxylic acid components contain about 4 to about 40 carbon atoms and are described in U.S. Pat. Nos. 5,608,031 and 5,668,243, herein incorporated by reference in their entirety. Preferably the additional dicarboxylic acid component is an acid, ester or anhydride of an aromatic dicarboxylic acid, preferably having 8 to 14 carbon atoms, an aliphatic dicarboxylic acid, preferably having 4 to 12 carbon atoms, or a cycloaliphatic dicarboxylic acid, preferably having 8 to 12 carbon atoms.

Particularly preferred examples of additional dicarboxylic acid components other than terephthalic acid, napthalenedicarboxylic acid, and 1,4-cyclohexane dicarboxylic acid to be used include, but are not limited to, isophthalic acid, sulfoisophthalic acid, 1,3-cyclohexanedicarboxylic acid, 1,4-cyclohexanediacetic acid, diphenyl-4,4'-dicarboxylic acid, succinic acid, glutaric acid, adipic acid, azelaic acid, sebacic acid, 1,12-diodecanedioc acid and dimer acid. Copolyesters may be prepared from one or more of the above dicarboxylic acids.

Branching Agents

Small amounts, typically less than about 2 mole %, of conventional branching agents may be reacted with the glycol component and dicarboxylic acid component to form the inventive copolyesters. Conventional branching agents include polyfunctional acids, anhydrides, alcohols and mixtures thereof. Examples of suitable branching agents, include, but are not limited to, trimellitic anhydride, pyromellitic dianhydride, glycerol, trimethylolpropane, and pentaerythritol.

Reaction Process for Forming the Copolyesters

In forming the copolyesters of the invention, the reaction of the glycol component and the dicarboxylic acid component may be carried out using conventional polyester polymerization conditions. For example, when preparing the copolyesters by means of an ester interchange reaction, i.e., from the ester form of the dicarboxylic acid components, the reaction process may comprise two steps. In the first step, the glycol component and the dicarboxylic acid component, such as dimethyl terephthalate, are reacted at elevated temperatures, typically, about 180° C. to about 280° C. and pressures ranging from about 0.0 to about 60 psig. Preferably, the temperature for the ester interchange reaction ranges from about 190° C. to about 240° C. while the preferred pressure ranges from about 15 psig to about 40 psig. Thereafter, the reaction product is heated under still higher temperatures and under reduced pressure to form polyester with the elimination of glycol, which readily volatilized under these conditions and removed from the system. The second step, or polycondensation step, is continued under higher vacuum and a temperature which generally ranges from about 240° C. to about 300° C., preferably about 250° C. to about 290° C. and most preferably about 270° C. to about 285° C., until a polymer having the desired degree of polymerization, determined by I.V., is obtained. The polycondensation step may be conducted under reduced pressure which ranges from about 400 mm Hg (torr) to about 0.1 mm Hg (torr). Without the aid of a suitable catalyst, the above reactions do not proceed at a noticeable rate.

To ensure that the reaction of the glycol component and dicarboxylic acid component by an ester interchange reaction mechanism is driven to completion, it is preferred to employ 3 moles and more preferably about 2.3 to about 2.6 moles of glycol component to one mole dicarboxylic acid component. It being understood, however, that the ratio of glycol component to dicarboxylic acid component is generally determined by the design of the reactor in which the reaction process occurs.

In the preparation of polyester by direct esterification, i.e., from the acid form of the dicarboxylic acid component, copolyesters are produced by reacting a dicarboxylic acid, such as terephthalic acid, napthalenedicarboxylic acid, 1,4-cyclohexanedicarboxylic acid, or mixtures thereof, with the glycol component. The reaction is conducted at a pressure of from about 1 to about 1000 pounds per square inch gauge pressure, preferably less than 100 psig to produce a low molecular weight, linear or branched polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

To ensure that the reaction of the glycol component and dicarboxylic acid component by a direct esterification reaction mechanism is driven to completion, it is preferred to employ about 3.0 to 1.05 moles glycol component to one mole dicarboxylic acid component. It being understood, however, that the ratio of glycol component to dicarboxylic acid component will be determined by the design of the reactor in which the reaction process occurs.

Lower I.V. copolyesters are generally obtained by employing shorter residence times or slow reaction rates as compared to processes for forming higher I.V. copolyesters. For example, the reaction rate can be slowed by reducing the reaction temperature, reducing the catalyst concentration, by increasing the absolute pressure in the reactor or by a combination of these factors.

The process of forming the copolyesters of the invention may be conducted as a batch, semi-batch or continuous process. Advantageously the process is operated as a continuous process. Indeed, it is possible to produce superior coloration of the copolyester when using a continuous process as the copolyester may deteriorate in appearance if the copolyester is allowed to reside in a reactor at an elevated temperature for too long a duration.

Catalyst System

A variety of catalyst systems are useful in promoting the reaction of the glycol component and the dicarboxylic acid component. Typically a catalyst system will contain catalytic materials and catalytic inhibitors.

Catalytic Materials

Catalytic materials which are suitable for the catalyst system include, but are not limited to, materials containing titanium, manganese, zinc, cobalt, antimony, gallium, lithium, calcium, silicon, and germanium. Indeed, such catalyst systems are described in U.S. Pat. Nos. 3,907,754, 3,962,189, 4,010,145, 4,356,299, 5,668,243, and 5,681,918, herein incorporated by reference in their entirety. Generally, the catalyst system of the invention comprises materials which contain titanium, manganese and/or zinc and mixtures thereof. While the amounts of the individual catalytic materials in the catalyst system will vary, it is desired that the total amount of catalytic materials in the catalyst system be below about 125 ppm, preferably below about 100 ppm and most preferably below about 80 ppm. The "ppm" for the catalyst system and the catalytic inhibitor described below, refers to the weight of the element referred to and is based upon the theoretical weight of the final copolyester product.

Titanium catalytic materials are usually added in the form of an alkoxide in an amount ranging from about 10 to about 35 ppm, more preferably about 10 to about 25 and most preferably about 12 to about 20 ppm. Indeed, copolyesters formed with lower levels of titanium catalytic materials have better stability when held in the melt. Suitable titanium alkoxides include, but are not limited to, acetyl triisopropyl titanate, tetraisopropyl titanate and tetraisobutyl titanate. The titanium catalytic material may be added to the reaction process prior to direct esterification or ester interchange reaction or prior to the polycondensation reaction.

Manganese is typically added in the form of a salt, such as an organic acid salt in an amount ranging from about 0 to 70 ppm, preferably about 30 to about 70 ppm and more preferably about 40 to about 50 ppm. Examples of suitable manganese salts include, but are not limited to, manganous benzoate tetrahydrate, manganese chloride, manganese oxide, manganese acetate, manganese acetylacetonate, and manganese succinate. Manganese is added to the reaction process prior to a direct esterification or ester interchange reaction.

Zinc may be added to the catalyst system in addition to the manganese or in place of the manganese catalyst. Zinc is typically added in the form of a salt in an amount ranging from 0 to 100 ppm, preferably about 25 to about 100 ppm and more preferably about 50 to about 80 ppm. Examples of suitable zinc compounds include, but are not limited to, zinc acetate, zinc phosphate monohydrate, zinc succinate, and zinc alkoxide. Zinc is typically added the reaction process prior to a direct esterification or ester interchange reaction.

If desired, a cobalt catalytic material, may also be employed as part of the catalyst system. When employed, cobalt is typically added in the form of a salt, such as an organic acid salt. Examples of suitable cobalt salts include, but are not limited to, cobaltous acetate trihydrate, cobaltous nitrate, cobaltous chloride, cobalt acetylacetonate, cobalt naphthenate, and cobalt salicylate. Cobalt may be added in an amount ranging from about 0.0 to 90 ppm. As described below, the cobalt may function as both a catalytic material and as a colorant. Cobalt is added to the reaction process after a direct esterification or ester interchange reaction.

In some embodiments antimony may be employed. When used, examples of suitable antimony compounds include, but are not limited to, antimonate esters of inorganic acids, antimony oxide, antimony alkoxides such as antimony isopropoxide, antimony halide, such as antimony chloride, antimony bromide and antimony fluoride, sodium or potassium antimonate, antimony carboxylates, such as antimony acetate and antimony glycolate or mixtures thereof. Preferably the antimony component is an antimony glycolate or an antimony oxide. Antimony is generally added after the ester interchange or a direct esterification reaction. When the copolyester is used to form binder fibers, antimony may be omitted from the catalyst system due to the yellowing caused by the presence of an antimony containing catalyst.

While less preferred, calcium, gallium and silicon catalytic materials may be used in the catalyst system. Examples of suitable calcium compounds include, but are not limited to, calcium acetate, calcium glycoxide, and calcium phosphate monohydrate. Examples of suitable gallium compounds include, but are not limited to, gallium chloride, gallium nitrate hydrate, gallium oxide, gallium lactate and gallium phosphide. Examples of suitable silicon compounds include, but are not limited to, silicon acetate and tetraethyl orthosilicate. Germanium catalytic materials include, but are not limited to oxides, organic salts and in particular glycolates of germanium.

A preferred ester interchange catalyst system for reacting esters of terephthalic acid, napthalenedicarboxylic acid, and 1,4-cyclohexane dicarboxylic acid contains titanium, manganese, and optionally cobalt materials. In the ester interchange catalyst system, the titanium is present in an amount ranging from about 10 to about 35 ppm, preferably about 10 to about 25 ppm and the manganese is present in an amount ranging from about 30 to about 70 ppm. Additionally, in another embodiment of the ester catalyst system, the total amount of catalytic materials in the catalyst system is less than or equal to about 125 ppm, preferably less than about 100 ppm, more preferably less than about 80 ppm and most preferably less than 70 ppm. A preferred ester catalyst system is typically used in combination with a catalytic inhibitor comprising about 40 to about 90 ppm P; and a colorant in an effective amount, for example, about 2 to about 10 ppm of a blue and/or red substituted anthraquinone dye. Generally, the preferred ester catalyst system is substantially free of Zn catalytic materials, more preferably contains less than 5 ppm Zn catalytic materials and most preferably is free of Zn catalytic materials. Additionally, when binder fibers are desired, the preferred ester catalyst system is substantially free of Sb catalytic materials, more preferably contains less than 5 ppm Sb catalytic materials and most preferably is free of Sb catalytic materials.

Catalytic Inhibitor

To stabilize the effects of the catalyst system and to promote efficiency of zinc, manganese and cobalt catalytic materials, it is desired to add a phosphorus catalytic inhibitor to the reaction process after an ester interchange or direct esterification reaction but prior to conducting the polycondensation reaction step. Typically, phosphorus is added in the form of a phosphate, such as phosphoric acid or an organic phosphate ester in an amount ranging from about 40 to 90 ppm and more preferably ranging from about 60 to 75 ppm. Suitable phosphate esters for use in this invention include, but are not limited to, ethyl acid phosphate, diethyl acid phosphate, triethyl phosphate, arylalkyl phosphates and tris-2-ethylhexyl phosphate. One useful phosphate catalytic inhibitor is sold under the Merpol® A which is commercially available from Du Pont.

Colorants

In forming the copolyesters of the invention, colorants, sometimes referred to as toners, may be added to impart a desired neutral hue and/or brightness to the resulting copolyester. When colored copolyesters are desired, pigments or colorants may be included in the reaction mixture during the reaction of the glycol component and the dicarboxylic acid component or they may be melt blended with the preformed copolyester. A preferred method of including colorants is to use a colorant having thermally stable organic colored compounds having reactive groups such that the colorant is copolymerized and incorporated into the copolyester to improve the hue of the copolyester. For example, colorants such as dyes possessing reactive hydroxyl and/or carboxyl groups, including, but not limited to, blue and red substituted anthraquinones, may be copolymerized into the polymer chain. Colorants and dyes are described in detail in U.S. Pat. Nos., 4,521,556, 4,740,581, 4,749,772, 4,749,773, 4,749,774, 4,950,732, 5,384,377, 5,372,864, 5,340,910 and 5,681,918, herein incorporated by reference in their entirety. When dyes are employed as colorants, they may be added to the copolyester reaction process after an ester interchange or direct esterification reaction. Furthermore, when a dye or dye mixture is employed as the toner colorant for the copolyester, it is preferred that the total amount of dye is less than 10 ppm.

Alternatively, inorganic pigments, such as titanium dioxide and cobalt containing materials, may be added to the reaction. Advantageously when a catalyst material contains cobalt, the cobalt may also act as a colorant. Care must be taken to control the level of cobalt in order to avoid opacity and dinginess in the copolyesters of the invention. To control the level of opacity and dinginess, cobalt may be employed in an amount ranging from about 0.0 to 90 ppm.

Copolyesters of the Invention

The copolyesters of the invention have an inherent viscosity, I.V., ranging from about 0.36 to 0.58. Preferably the copolyesters of the invention have an I.V. ranging from about 0.38 to about 0.58, more preferably about 0.4 to about 0.53, more preferably about 0.40 to about 0.50 and most preferably about 0.41 to about 0.49. The I.V. of the copolyesters of the invention is determined by measuring the I.V. at 25° C. using 0.5 g polymer per 100 mL of a solvent consisting of 60% by weight phenol and 40% by weight tetrachloroethane. The basic method of determining the I.V. of a copolyester is set forth in ASTM D-2857-70. The copolyesters produced with the lower I.V. values possess excellent color as they are clearer than previous copolyesters and may accept dyes more easily than higher I.V. copolyesters. Furthermore, low I.V. copolyesters are more easily dyed at lower temperatures and possibly more easily printed than similar higher I.V. copolyesters. Additionally, since the copolyesters of the invention have low I.V. values, the production rates of the copolyesters are quite rapid.

The polymerization of 1,4-cyclohexanedimethanol with ethylene glycol and terephthalic acid may be controlled to form an amorphous polyethylene terephthalate polymer with a glass transition temperature similar to polyethylene terephthalate. As is known in the art, amorphous polymers generally have higher clarity and are not opaque like many crystalline polymers. Therefore, while some of the 1,4-cyclohexanedimethanol levels employed may form copolyesters having some crystallinity, the superior clarity of amorphous polyesters provides some distinct advantages.

Generally, a lower I.V. copolyester will have a lower extrusion temperature. Hence, copolyesters of the invention may advantageously be melt spun into fibers at a lower temperature. For example a copolyester of the invention with an I.V. of 0.47 may be melt spun at a temperature of approximately 233° C. Where as a similar copolyester with an I.V. of 0.6 to 0.7 generally requires fiber spinning at a temperature of 275–285° C. Typically, a copolyester of the invention is melt spun at a temperature of less than about 250° C., in some cases as low as 235° C., which approaches conditions used to spin polypropylene. These copolyesters can be melt spun through a spinnerette with about 332 holes and a hole size of about 0.55 mnm. Generally, the melt spinning pressures will vary from about 1000 psig to 2000 psig.

Typically, the clarity and color (hue) of the copolyesters may be evaluated using a standard spectrocolorimeter. For example, a suitable spectrocolorimeter for evaluating the clarity and color of the copolyester is a HunterLab UltraScan which is commercially available from HunterLab of Reston, Va. Through the use of a HunterLab UltraScan spectrocolorimeter, the clarity and color, i.e., yellowness and/or blueness may be quantified. The use of a HunterLab UltraScan spectrocolorimeter for evaluating and quantifying the color and clarity of a copolyester is described in U.S. Pat. No. 5,681,918, herein incorporated by reference in its entirety. When using the HunterLab UltraScan an L★ value indicates the level of clarity with higher L★ values representing higher levels of clarity. The level of yellowness and/or blueness is quantified as a b★ value with 0.0 representing neutral, whereas values above 0.0 indicate levels of yellowness and values below 0.0 indicate the level of blueness in the copolyester. The copolyesters of the invention typically have an L★ value of more than about 65, generally about 69 to about 72, and a b★ value varying from between about −2.5 to about +2.5, preferably varying from about −1.0 to about +1.0, and more preferably ranging from about −0.5 to about +0.5 and most preferably about 0.0.

Products Formed from Copolyesters of the Invention

The copolyesters of the invention may be used to form an article of manufacture or be used as an additive, such as a compounding additive concentrate or master batch for another polymer system. In addition, binder fibers and other articles may be formed with the copolyesters that include, but are not limited to, plastics and films, including containers, molded parts, sheeting and extruded films and fibers. The inventive copolyesters may be part of the articles to be formed or may form the entire article.

Conventional additives may be added to the copolyesters of the invention, depending upon the desired end use of the copolyester. Suitable additives for the copolyesters are described in detail in U.S. Pat. Nos. 5,608,031 and 5,773,554 herein incorporated by reference in its entirety. Typical additives for the copolyesters include pigments, antioxidants, stabilizers, flame retardants, tougheners, epoxy compounds, mold release agents, nucleating agents, free radical stabilizers, lubricants, and other processing agents.

A preferred article of the invention is a fiber. The fiber may be prepared in any desired length known in the art and generally in the form of a filament or staple fiber. Fibers may be made from the copolyesters of the invention through any conventional means available including, but not limited to, melt spinning, melt-blow or extruding the copolyester into a fiber form. Depending upon the end use, any desired denier may be formed with the fibers employing copolyesters of the invention, including fibers having a denier value ranging from microdenier to about 50 denier, preferably up to about 20 denier.

The copolyesters may be used to form binder fibers in any desired configuration known in the art. The copolyesters of the invention are preferably binder fibers having the form of a fibrous structure. A major advantage of binder fibers is that bonded products can be obtained by the mere application by treatment with heat, radio frequencies or ultrasonic frequencies to an unbonded batt of filaments with little or no change in shape. Indeed, the copolyesters of the invention are particularly suited for use as binder fibers as the copolyesters possess a lower I.V. which allows better flow and softening properties at lower temperatures. Hence, improved bonding of the binder fiber is possible at lower temperatures than previously known binder fibers for nonwoven fabrics when employing binder fibers containing the copolyesters of the invention. Indeed, the binder fibers formed from the copolyesters of the invention are particularly suited for bonding to polyester, acrylic, nylon, glass, cotton and scoured wool. Typically, the binder fibers formed with the copolyesters of the invention will have deniers of about 1.5 to about 20. However, other fibrous forms such as melt blown webs or spun bond many have microdenier sizes.

The binder fibers of the invention may be in the form of unicomponent binder fibers and bicomponent sheaths or other surface segments are formed with copolyesters of the invention having an I.V. of about 0.36 to about 0.58. Shaped binder fibers may be formed with the tops of the cross-sectional legs capped with binder materials during extrusion.

Bicomponent binder fibers may have a sheath/core, side by side, or other configuration known in the art. The process of preparing and bonding a low melt temperature bicomponent binder fiber is described in detail in U.S. Pat. No. 3,589,956, herein incorporated by reference in its entirety. In a bicomponent fiber of the invention, the copolyesters of this invention will be present in amounts of about 10 to about 75 weight % of the bicomponent fiber. The other component may be from a wide range of other polymeric materials including, but not limited to, polyesters such as polyethylene terephthalate or polybutylene terephthalate. Bicomponent binder fibers may be blended with other fibers or used alone to make nonwoven fabrics and high loft battings having various properties. Generally, bicomponent binder fibers contain a polymer having a high melting point to ensure structural integrity during the bonding process and a lower melting or amorphous polymer to bond the matrix in nonwoven fabrics. Alternatively, economics may dictate that a much less expensive core material be used.

Binder fibers from this invention are readily blended with a wide range of other fibers and subsequently heat or energy activated to provide nonwoven fabrics having good integrity and strength. For example, other fibers in the blends could include, but are not limited to, polyester, acrylic, nylon, glass, cellulosic (cotton, pulp based fibers, cellulose ester fibers etc.) and other similar fibers. Incorporation in nonwovens can also aid lamination to other fabrics, films and some metallic surfaces. The amount of binder fiber in the nonwoven blend will generally be in the range of about 5 to about 30 weight %; however, there are instances where 100% binder fibers are used in fabric form.

Another fibrous structure which may be made with the copolyesters of the invention is a composite fiber which may be formed by melt blending a polyolefin or a functionalized polyolefin with the copolyester of the invention. The melt blended copolyester/polyolefin may be spun as a fiber to form a fibrous structure.

The fibrous structures of the invention are particularly useful for processing into a wide variety of nonwoven, knitted and tufted textiles for a variety of application, but are particularly suitable for the manufacture of bonded, nonwoven and textiles, either quilted or unquilted, which may be actuated by a variety means. They are also suitable for use in making a wide variety of products including, but not limited to, high loft battings, needle punched fabrics, flat nonwovens, hydroentangeled fabrics, stitch-bonded fabric (to minimize pilling), wet-laid non-woven fabrics and paper, filter media, face masks, scatter rugs, cotton carpeting, cellulosic insulation, absorbent products, fiberglass composites, pillow fillings, fillings for sleeping bags, cushions, quilts, comforters, coverlets, mattresses, mattress pads, mattress toppers, furniture and auto upholstery, bedspreads, pile fabrics for industrial and apparel uses, blankets, women's robes, sport jackets, car coats, interlining, outerwear, floor covering materials, tiles, carpets, bath mats footwear, ribbons and molded articles.

Another suitable use for the copolyesters of the invention is as a copolyester carrier material. For example, the copolyester of the invention may be mixed with colorants or additives to form a copolyester carrier material which may then be compounded with another polymer. The copolyester may be blended or mixed by any suitable technology known in the art.

EXAMPLES

Example 1

Low Catalyst, Low I.V. Copolyesters for Binder Fibers

A comparison was made between copolyesters formed with an I.V. of 0.59 and a low I.V. of 0.47. The copolyester formed with the higher I.V. of 0.59 was made using a catalyst system with a high concentration of catalytic materials. In contrast, the copolyesters formed with the low I.V. of 0.47 were formed using a catalyst system having a low concentration of catalytic materials.

A low I.V. copolyester containing about 31 mole % 1,4 cyclohexanedimethanol and about 69 mole % ethylene glycol was prepared from 1,4 cyclohexanedimethanol, ethylene glycol and dimethyl terephthalate. The reaction was conducted with an excess of the glycol component. The reaction proceeded by first conducting an ester interchange reaction step followed by a polycondensation reaction step. The ester interchange reaction was conducted at a temperature ranging from 190° C. to 240° C. and a pressure of 15 to 40 psig in the presence of a catalyst system containing 16 ppm Ti (as tetraisopropyl titanate) and 46 ppm Mn (as manganese acetate). The product of the ester interchange reaction was subjected to a polycondensation reaction step where the temperature started at from 250° C. to 260° C. and ended at 269° C. to 282° C. Likewise the pressure for the polycondensation reaction started at 75 to 200 torr and finished at 0.3 to 2.5 torr. Prior to commencing a polycondensation step, less than about 10 ppm of a mixture of blue and red anthraquinone dyes was added to the catalyst system and a catalytic inhibitor comprising Merpol A from Du Pont was added in an amount of about 70 ppm P.

The high I.V. copolyester, I.V. 0.59, was prepared to have the same composition as the low I.V. copolyesters. As with the low I.V. copolyesters, the reaction proceeded by first conducting an ester interchange reaction step followed by a polycondensation reaction step. The ester interchange reaction was conducted at a temperature ranging from 190° C. to 240° C. and a pressure of 15 to 40 psig in the presence of a catalyst system containing 56 ppm Ti (as tetraisopropyl titanate) and 46 ppm Mn (as manganese acetate). The product of the ester interchange reaction was subjected to a polycondensation reaction step where the temperature started at from 250° C. to 260° C. and ended at 275° C. to 285° C. The pressure for the polycondensation reaction started at 75 to 200 torr and finished at 0.3 to 2.0 torr. The use of a longer reaction time was required to obtain the higher I.V. copolyester. Prior to commencing a polycondensation step, 56 ppm cobalt acetate was added to the catalyst system and a catalytic inhibitor comprising Merpol A from Du Pont was added 79 ppm P.

A HunterLab UltraScan spectrocolorimeter was employed for evaluating and quantifying the color and clarity of the three copolyesters.

TABLE 1

| IV | L★ Color | b★ Color |
|---|---|---|
| 0.47 | 69–72 | −0.5–+0.5 |
| 0.59 | 64.2 | 2.7 |

As evident from Table 1, the lower I.V. copolyesters formed with the low catalyst concentration systems possessed superior clarity and color.

Example 2
Bond Strengths for Binder Fibers Made with Low and High I.V. Copolyesters Copolyester pellets having an I.V of 0.47 and containing about 31 mole % 1,4 cyclohexanedimethanol and about 69 mole % ethylene glycol were prepared from 1,4 cyclohexanedimethanol, ethylene glycol and dimethyl terephthalate under reaction conditions similar to that of example 1. The catalyst system used to form the low I.V. pellets contained 35 ppm Ti (as tetraisopropyl titanate) and 46 ppm Mn (as manganese acetate), 50 ppm cobalt acetate while the catalytic inhibitor comprised Merpol A from Du Pont in an amount of 70 ppm P.

The 0.47 I.V. copolyester pellets were dried in a rotary dryer at 65° C. for 4 hours. Unicomponent binder fibers were formed from the low and high I.V. copolyester pellets by melt extruding the pellets into multifilament fibers of 9 denier/filament. The filaments were formed using a spinneret having 332 holes (0.55 mm orifices), a melt temperature of 233° C. and a take-up speed of 100 m/m. The copolyester pellets of I.V. 0.59 from example 1, were likewise formed into unicomponent binder fibers, except that the pellets were spun at a melt temperature of 275° C.

The as-spun fibers were subsequently drafted in a 2-stage process (70° C. water, followed by a heated chamber), 3:1 total draft ratio, and stuffer box crimped to 7 crimps/inch and an 88 degree crimp angle. The resulting 3 denier filament fiber was then lubricated with a water-based finish and oven dried.

Both the low I.V. 0.49 and high I.V. 0.59 copolyester unicomponent binder fibers were combined with 75% polyethylene terephthalate fibers to form an 3 oz/yd$^2$ intimately blended carded nonwoven fabrics. The nonwoven fabrics were activated and subjected to bonding strength testing by bonding the intimately blended nonwoven on a press, with the upper and lower heated plates contacting the nonwoven with pressure. Activation was 30 seconds at temperatures ranging from 200 to 275° F. One-inch wide strips were used to obtain the Instron tensiles at a 5-inch gauge length. The results of the bond strength tests are presented in detail in Table 2 below.

TABLE 2

PET/Uni-Component Nonwoven Samples

| Activation Temp. ° F. | Avg. Break Force, g | Avg. Elongation, % | Avg. Modulus, g |
|---|---|---|---|
| Nonwoven Fabric w/Binder Fiber from 0.47 I.V. Copolyester | | | |
| 200 | 333 | 12.0 | 12,637 |
| 225 | 820 | 4.1 | 61,637 |
| 250 | 2899 | 15.3 | 116,625 |
| 275 | 4837 | 22.6 | 97,984 |
| Nonwoven Fabric w/Binder Fiber from 0.59 I.V. Copolyester | | | |
| 200 | 35 | 18.5 | 481 |
| 225 | 196 | 5.0 | 9,273 |
| 250 | 617 | 6.9 | 29,340 |
| 275 | 2366 | 15.4 | 71,949 |

Similar testing was also conducted with a coextruded sheath/core bicomponent binder fiber, having a 35% 0.41 I.V. copolyester binder sheath and a 65% polyethylene terephthalate core having about 4 denier. Similar results were obtained.

Example 3
Bond Strengths Testing of Binder Fibers

Unicomponent binder fibers were formed from a terephthalate copolyester containing 31 mole % 1,4 clohexanedimethanol, 69% ethylene glycol and a dicarboxylic acid component containing 100 mole % dimethyl terephthalate.

A first unicomponent binder fiber was formed from a first copolyester which was formed in the presence of a catalyst system having a low level of catalytic materials. For the first copolyester, an ester interchange reaction step occurred in the presence of a catalyst system containing 35 ppm Ti (as tetraisopropyl titanate) and 46 ppm Mn (as manganese acetate). Prior to commencing a polycondensation step, 50 ppm Co (as cobalt acetate) was added to the catalyst system and a catalytic inhibitor comprising Merpol A from Du Pont was added in an amount of 70 ppm P. The first copolyester was formed with an I.V. of 0.47 and possessed a denier of about 3.

A second unicomponent binder fiber was formed from the copolyester pellets of example 1 having an I.V. of 0.47. The 0.47 I.V. copolyester pellets of example 1 were formed in the presence of a lower concentration catalyst system. The second unicomponent binder fiber possessed a denier of about 3.

The first and second unicomponent binder fibers were combined with polyethylene terephthalate fibers having a denier of 6 to form a nonwoven fabric. The binder fiber comprised 25% of the nonwoven fabric with the polyethylene terephthalate fibers comprising the other 75%. The nonwoven web containing the binder fibers activated and subjected to bonding strength testing by the procedures described in Example 2 above, except that the upper and lower plates were gapped to allow touch contact, without any pressure registering on the pressure gauge. The results of the bond strength tests are set forth below in Table 3.

TABLE 3

| Activation Temp. °F. | Avg. Break Force, g | Avg. Elongation, % | Avg. Modulus, g |
|---|---|---|---|
| Nonwoven Fabric w/Binder Fiber from First Copolyester | | | |
| 300 | 2,591 | 18 | 31,636 |
| 325 | 2,476 | 26 | 17,340 |
| Nonwoven Fabric w/Binder Fiber from Second Copolyester | | | |
| 300 | 2,434 | 17 | 45,586 |
| 325 | 2,661 | 21 | 27,966 |

As shown by the above Table 3, the use of differing levels of catalyst materials within the scope of the invention did not appear to significantly effect the binding strength of the binder fibers made with similar intrinsic viscosities.

Example 4

Unicomponent binder fibers were formed from copolyesters containing 31 mole % 1,4 cyclohexanedimethanol, 69% ethylene glycol and a dicarboxylic acid component containing 100 mole % dimethyl terephthalate. A first unicomponent binder fiber was made from the low I.V., lower catalyst second copolyester of example 3. A second unicomponent binder fiber was made from the copolyester of example 1 having an I.V. of 0.59. Both the first and second umcomponent binder fibers were made by the process described in example 2. Intimately blended carded nonwoven fabrics were made from the first and second unicomponent binder fibers by the process described in example 2. Bond strength testing was performed similar to that described in example 3. The results of the bonds strength testing are presented below in table 4.

TABLE 4

| Activation Temp. °F. | Avg. Break Force, g | Avg. Elongation, % | Avg. Modulus, g |
|---|---|---|---|
| Nonwoven Fabric w/Binder Fiber from 0.47 I.V. Copolyester | | | |
| 225 | 133 | 7 | 5,841 |
| 250 | 393 | 6 | 15,827 |
| 275 | 883 | 12 | 29,362 |
| 300 | 2434 | 17 | 45,586 |
| 325 | 2661 | 21 | 27,966 |
| Nonwoven Fabric w/Binder Fiber from 0.59 I.V. Copolyester | | | |
| 225 | 45 | 20 | 652 |
| 250 | 219 | 5 | 7,947 |

TABLE 4-continued

| Activation Temp. °F. | Avg. Break Force, g | Avg. Elongation, % | Avg. Modulus, g |
|---|---|---|---|
| 275 | 590 | 12 | 15,372 |
| 300 | 1,748 | 22 | 20,433 |
| 325 | 2,640 | 29 | 17,902 |

As shown by table 4, the binder fibers formed with the lower I.V. of 0.47 possessed higher bond strength at lower activation temperatures.

Example 5
Low Viscosity PET Copolyester Containing 30/70 cis/trans mixture of 1,4-cyclohexanedimethanol.

A polyethylene terephthalate copolyester was formed from a glycol component and a dicarboxylic acid component. The glycol component contained 31 mole % of a 30/70 cis/trans mixture of 1,4-cyclohexanedimethanol, and 69 mole % ethylene glycol. The dicarboxylic acid component comprised 100 mole % dimethyl terephthalate. The polyethylene terephthalate copolyester was prepared by a melt phase polycondensation process using a catalyst system containing 32 ppm Ti, 46 ppm M, 50 ppm Co and 70 ppm P. The polyethylene terephthalate copolyester formed had an I.V. of 0.50.

Pellets of this copolyester were dried at 60° C. for 2 hours and then melt extruded into multifilament fibers of 9 denier/filament using a spinneret having 332 holes (0.55 mm orifice) at a take-up speed of 1000 m/m, a melt spun temperature of 240° C. and an extrusion rate of 43 pounds per hour. A velocity of 145 cubic feet per minute was used to quench the filaments during extrusion. The as-spun fibers were subsequently drafted in a one-stage drawing process using a 68° C. water bath. The fibers were stuffer box crimped to provide 7.5 crimps per inch and a crimp angle of 90 degrees using a clapper setting of 9.5 psi with no live steam. The fiber was dried in a relaxed state at 60° C. for 2 minutes. The resultant staple fiber was determined to have 3 denier per filament.

Good results were similarly achieved when the copolyester was not dried prior to the spinning operation.

Fibers were also readily produced from PET copolyesters containing 22 mole % CHDM (I.V. 0.40) or 45 mole % CHDM (I.V. 0.49).

Example 6
Preparation of Nonwoven Web

A 3 denier per filament, unicomponent binder fiber from Example 5 was blended with polyethylene terephthalate staple fibers (2 ¼ denier per filament) to provide a blend containing 20 weight % binder fiber. A 1 ¼ oz/yd² intimately blended nonwoven web was formed by carding. The nonwoven web was bonded by conveying the web through an infrared oven, followed by hot nipping (80° C.). Good machine and cross direction tensile strength and drapeability were obtained.

Good bonding was also obtained by passing the web from the card through an air flow-through oven at 150° C. for a two minute dwell time.

Binder fibers from the compositions of this invention were determined to be ultrasonic and radio frequency activatable.

Example 7
Preparation of a Brightly Colored Nonwoven Web

A 1 ½ oz/yd² nonwoven web fabric was produced similar to Example 6; however, the matrix polyester was colored red. The clear, non-opaque bonds provided by the unicomponent binder fiber from Example 5 minimally affected the brightness of the shade. This is an advantage over isophthalic modified polyethylene terephthalate copolyester binder fibers which generally are more opaque and often contribute to a frosty, hazy looking appearance on dyed goods.

Example 8
Sheath/Core Bicomponent Fiber

A 50/50 sheath/core bicomponent fiber was made using polyethylene terephthalate homopolymer (I.V. 0.54) as the core and a polyethylene terephthalate copolyester similar to that in Example 5 (I.V. 0.41) as the sheath. The bicomponent fiber was formed as follows: Crystallized, dried pellets of PET were melted in an extruder and fed as the core at a melt temperature of 295° C. Dried pellets of PET copolyester were transported to the feed hopper of the extruder feeding the sheath melt stream. The sheath stream was extruded at a melt temperature of 225° C. The molten streams are coextruded through a spinnerette having a sheath/core hole configuration at metering rates adjusted to produce fibers having a 50% copolyester sheath/50% PET core. A similar 35/65 sheath/core bicomponent fiber was also produced in filament and staple form. The fibers were drawn with draw roll speeds to produce 4 denier per filament fibers which were then crimped and cut into staple fibers (51 mm long).

These bicomponent binder fibers are useful in making nonwoven fabrics and high loft battings in combinations with polyethylene terephthalate and/or other matrix staple fibers. These binder fibers can also be used in 100% form.

We claim:

1. A binder fiber comprising a copolyester formed from the reaction product of:
    a glycol component with a dicarboxylic acid component, wherein the glycol component comprises 1,4-cyclohexanedimethanol in an amount ranging from about 10 to about 60 mole % and ethylene glycol in an amount ranging from about 40 to about 90 mole %, wherein at least about 90 mole % of the dicarboxylic acid component is selected from the group consisting of acids, anhydrides, or esters of terephthalic acid, naphthalenedicarboxylic acid, 1,4-cyclohexanedicarboxylic acid and mixtures thereof, and wherein the copolyester has an I.V. of between about 0.36 to 0.58 measured at 25° C. using 0.5 g polymer per 100 mL of a solvent consisting of 60% by weight phenol and 40% by weight tetrachloroethane.

2. The binder fiber of claim 1, wherein at an activation temperature of less than about 275° F., the binder fiber possesses superior bonding strength when compared to a binder fiber formed from a copolyester having an I.V. of 0.6 or higher.

3. The binder fiber of claim 1, wherein the binder fiber may be activated by ultrasonic and radio frequencies.

4. The binder fiber of claim 1 wherein the binder fiber has a denier ranging from about 1 to about 20.

5. The binder fiber of claim 1 wherein the binder fiber is a unicomponent binder fiber.

6. The binder fiber of claim 1 wherein the binder fiber is a bicomponent binder fiber.

7. A copolyester comprising the reaction product of:
    a glycol component with a dicarboxylic acid component, wherein the glycol component comprises 1,4-cyclohexanedimethanol in an amount ranging from about 10 to about 60 mole % and ethylene glycol in an amount ranging from about 40 to about 90 mole %, wherein at least about 90 mole % of the dicarboxylic acid component is selected from the group consisting of acids, esters, or anhydrides of terephthalic acid, naphthalenedicarboxylic acid, 1,4-cyclohexanedicarboxylic acid and mixtures thereof, and wherein the copolyester has an I.V. of between about 0.36 to 0.58 measured at 25° C. using 0.5 g polymer per 100 mL of a solvent consisting of 60% by weight phenol and 40% by weight tetrachloroethane and an L★ value of greater than about 65.

8. A copolyester according to claim 7, wherein the L★ value is greater than about 65 and the b★ value ranges from about −2.5 to about +2.5.

9. A copolyester according to claim 7, wherein the dicarboxylic acid component is an ester or mixture of esters of terephthalic acid, napthalenedicarboxylic acid or 1,4-cyclohexane dicarboxylic acid.

10. A copolyester according to claim 7, wherein the copolyester is formed in the presence of a catalyst system comprising about 10 to about 35 ppm Ti, about 30 to about 70 ppm Mn, about 0 to about 90 ppm Co and in the presence of a catalytic inhibitor comprising about 40 to about 90 ppm P based on the weight of the copolyester.

11. A copolyester according to claim 7, further comprising an additional dicarboxylic acid component in an amount of up to 10 mole % of the dicarboxylic acid component, wherein the additional dicarboxylic acid component is selected from the group consisting of aromatic dicarboxylic acids having about 8 to 14 carbon atoms, aliphatic dicarboxylic acids having about 4 to 12 carbon atoms, cycloaliphatic dicarboxylic acids having about 8 to 12 carbon atoms and esters or anhydrides thereof.

12. A copolyester according to claim 7, wherein the glycol component comprises 1,4 cyclohexanedimethanol in an amount ranging from 20 to 40 mole % and ethylene glycol in an amount ranging from about 60 to about 80 mole %.

13. A copolyester according to claim 7, wherein the glycol component comprises 1,4 cyclohexanedimethanol in an amount ranging from 25 to 35 mole % and ethylene glycol in an amount ranging from about 65 to about 75 mole %.

14. A copolyester according to claim 7, wherein the glycol component contains diethylene glycol in an amount up to 20 mole %.

15. A copolyester according to claim 7, wherein the I.V. value ranges from about 0.41 to 0.49.

16. A copolyester according to claim 7, wherein the copolyester is formed in the presence of a branching agent.

17. A copolyester according to claim 7, wherein the copolyester is capable of being melt spun into a fiber at a temperature of less than about 270° C.

18. A copolyester composition comprising the copolyester according to claim 7 and an additive selected from the group consisting of a pigment, a colorant, a stabilizer, an antioxidant, an extrusion aid, a slip agent, carbon black, a nucleating agent, a flame retardant, a filler, a conductive material, an adhesion promoter, a toughener, a viscosity modifier, a dye promoter and mixtures thereof.

19. A copolyester of claim 7, wherein the copolyester is in fibrous form.

20. The copolyester of claim 19, wherein the fibrous form of the copolyester has a denier ranging from 20 to microdenier sizes.

21. A fibrous structure comprising a fiber formed by melt blending a polyolefin or a functionalized polyolefin with the copolyester of claim 7.

22. A copolyester comprising the reaction product of:
    a glycol component with a dicarboxylic acid component, wherein the glycol component comprises 1,4-cyclohexanedimethanol in an amount ranging from 10 to 60 mole % and ethylene glycol in an amount ranging from about 40 to about 90 mole %, wherein at least about 90 mole % of the dicarboxylic acid component is selected from the group consisting of acids, esters or anhydrides of terephthalic acid, naphthalenedicarboxylic acid, 1,4-cyclohexanedicarboxylic acid and mixtures thereof, wherein the copolyester is formed in the presence of a catalyst system comprising about 10 to about 35 ppm Ti and wherein the copolyester has an I.V. of between about 0.36 to 0.58 measured at 25° C. using 0.5 g polymer per 100 mL of a solvent consisting of 60% by weight phenol and 40% by weight tetrachloroethane.

23. A catalyst system for producing a copolyester comprising:

a catalytic material comprising about 10 to about 35 ppm Ti and about 30 to about 70 ppm Mn, wherein the total amount of catalytic materials in the catalyst system is less than or equal to about 125 ppm;

a catalytic inhibitor comprising about 40 to about 90 ppm P; and an effective amount of a colorant other than cobalt to produce a desired color; and wherein the amounts of the catalyst system components are based upon the weight of the copolyester product formed with the catalyst system.

24. The catalyst system of claim 23, wherein the total amount of catalytic materials in the catalyst system is less than 100 ppm.

25. The catalyst system of claim 23, wherein the catalyst is substantially free of Sb and Zn catalysts.

26. The copolyester of claim 7, wherein the copolyester is melt blended with another polymer.

27. A fibrous structure comprising a fiber formed from a melt blend of the copolyester of claim 7 and another polymer.

28. An additive comprising a melt blend of the copolyester of claim 7 and a first polymer, wherein the additive when blended with a second polymer is capable of forming a fiber and wherein the first and second polymers may be the same polymer.

* * * * *